United States Patent [19]
Nagai et al.

[11] Patent Number: 5,974,581
[45] Date of Patent: Oct. 26, 1999

[54] INFORMATION RECORDING METHOD, REPRODUCING METHOD, AND REPRODUCING APPARATUS

[75] Inventors: Yutaka Nagai; Masafumi Nakamura; Toshifumi Takeuchi; Masayuki Hirabayashi, all of Yokohama, Japan

[73] Assignee: Hitachi, Ltd.

[21] Appl. No.: 08/957,741

[22] Filed: Oct. 24, 1997

Related U.S. Application Data

[63] Continuation of application No. 08/602,708, Feb. 16, 1996, Pat. No. 5,768,298.

[30] Foreign Application Priority Data

Feb. 24, 1995 [JP] Japan .................................. 7-036462
Mar. 6, 1995 [JP] Japan .................................. 7-045245

[51] Int. Cl.⁶ .......................... G11B 20/14; G11B 20/18
[52] U.S. Cl. .................. 714/755; 714/769; 714/775; 369/48; 369/59; 369/275.3
[58] Field of Search ............... 371/42, 37.4, 40.14; 369/48, 53, 59; 714/769, 755, 775

[56] References Cited

U.S. PATENT DOCUMENTS

| | | | |
|---|---|---|---|
| 4,750,178 | 6/1988 | Sako et al. | 371/37 |
| 4,819,236 | 4/1989 | Sako et al. | 371/38 |
| 4,907,215 | 3/1990 | Sako et al. | 369/59 |
| 4,912,695 | 3/1990 | Senshu | 371/40.4 |
| 5,060,221 | 10/1991 | Sako et al. | 369/59 |
| 5,276,674 | 1/1994 | Tanaka | 369/275.3 |
| 5,537,422 | 7/1996 | Shimpuku et al. | 371/42 |
| 5,586,108 | 12/1996 | Hoshino | 369/275.3 |
| 5,587,991 | 12/1996 | Nabeshima et al. | 369/275.3 |
| 5,666,338 | 9/1997 | Ishizawa et al. | 369/48 |
| 5,768,298 | 6/1998 | Nagai et al. | 371/40.14 |

FOREIGN PATENT DOCUMENTS

| | | |
|---|---|---|
| 0240363 | 10/1987 | European Pat. Off. . |
| 0472415 | 2/1992 | European Pat. Off. . |
| 0671738 | 9/1995 | European Pat. Off. . |
| 58-148551 | of 1983 | Japan . |
| 62-192076A | of 1987 | Japan . |
| 01235073 | 9/1989 | Japan . |
| 02263365 | 10/1990 | Japan . |
| 5-135367 | of 1993 | Japan . |
| 8-221906 | of 1996 | Japan . |
| 08031104 | 2/1996 | Japan . |

OTHER PUBLICATIONS

Lin, S. et al., "Error Control Coding", Prentice–Hall, 1983, pp. 274–278, Dec. 1983.
European Search Report dated Feb. 21, 1997.

*Primary Examiner*—Stephen M. Baker
*Attorney, Agent, or Firm*—Evenson, McKeown, Edwards & Lenahan, P.L.L.C.

[57] ABSTRACT

In a system recording compressed video and audio signals or computer user data on a disk in the sector unit, to reproduce the data in a simple fashion at a high speed, data to be recorded on the disk is divided into data in a predetermined unit so as to add a first error correction (C1) code to each of the resultant data, which form (C1) correction blocks. Sectors are produced each including a plurality of (C1) correction blocks. Added to each (C1) correction block is a code enabling identification of a sector. To all data in the plural (C1) correction blocks, a second error correction (C2) code is added to record the resultant data on the disk to allow interleaving or deinterleaving completing in a block. The capacity of each sector is set to be substantially equal to that of a plurality of transport packets.

5 Claims, 12 Drawing Sheets

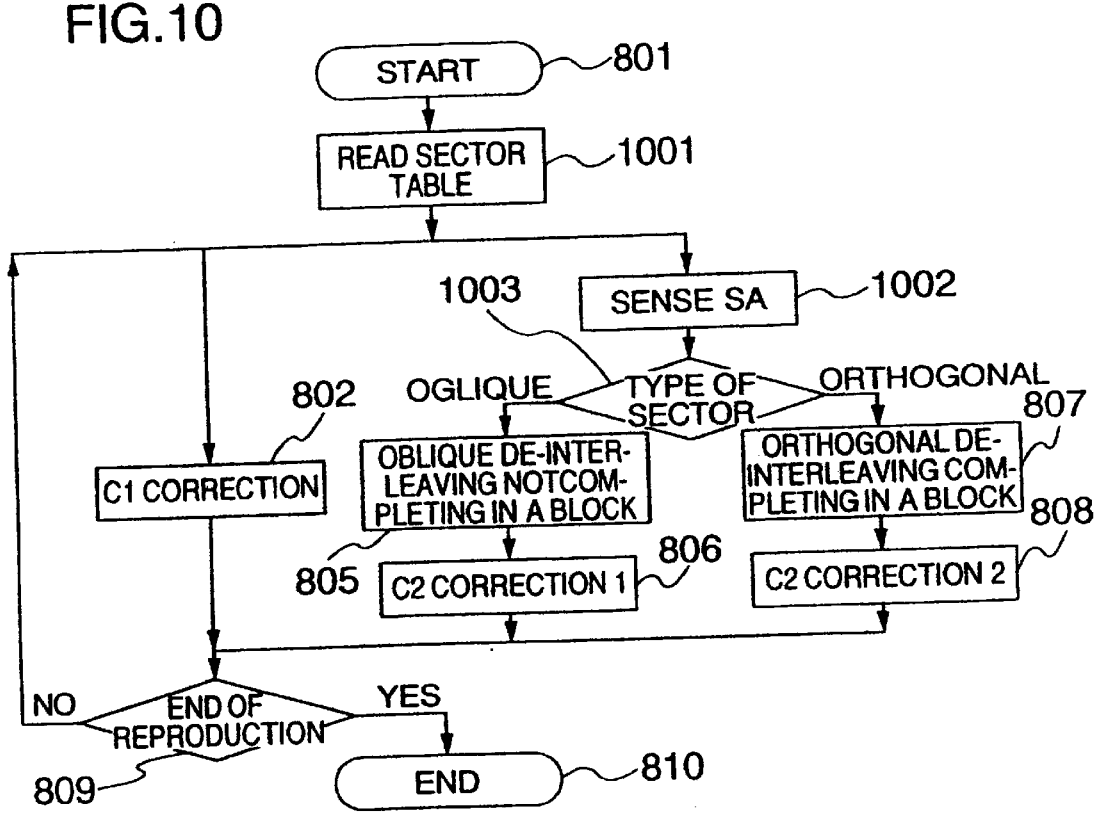
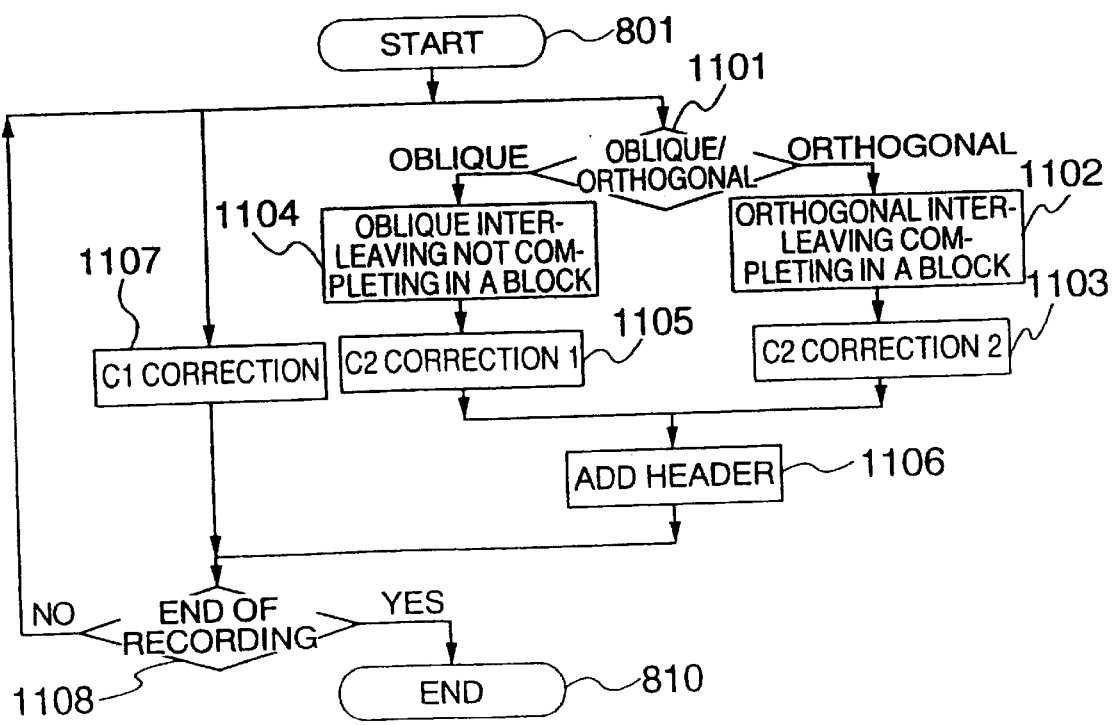

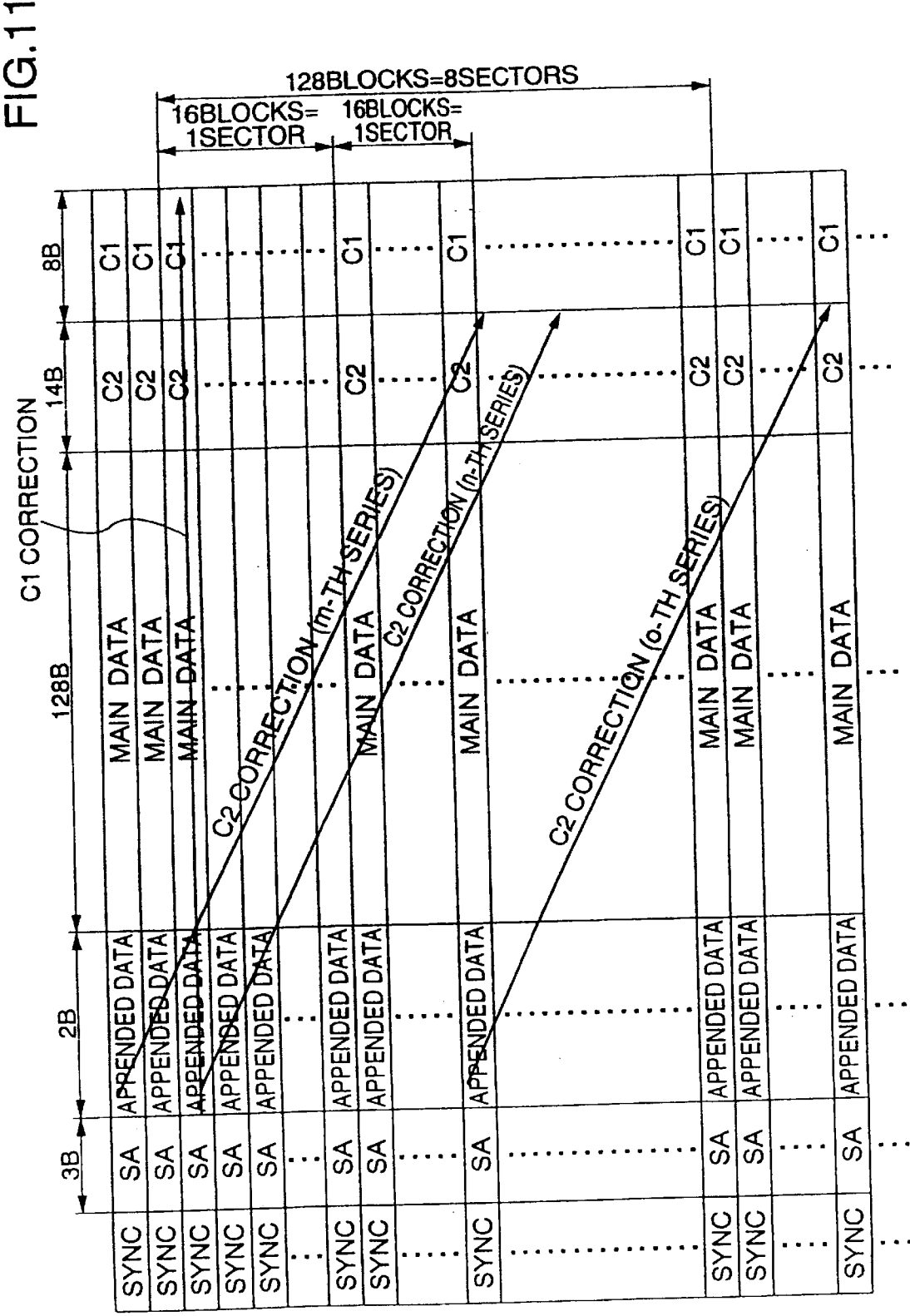

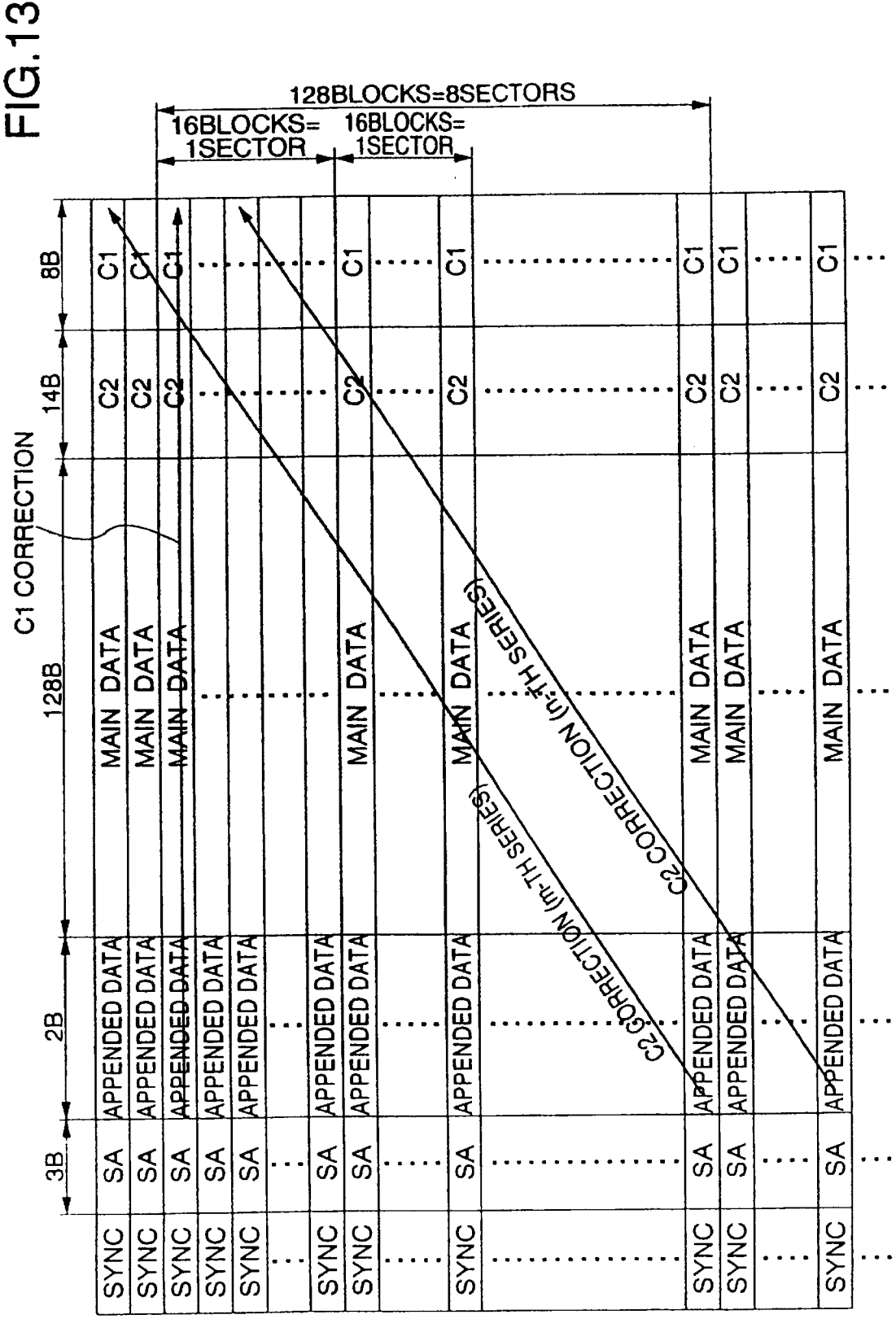

INFORMATION RECORDING METHOD, REPRODUCING METHOD, AND REPRODUCING APPARATUS

This application is a continuation of application Ser. No. 08/602,708, filed Feb. 16, 1996, now U.S. Pat. No. 5,768, 298.

BACKGROUND OF THE INVENTION

The present invention relates to an apparatus for recording and/or reproducing compressed video and audio signals and/or computer application data on such recording media as an optical disk.

Optical disks dedicated for reproduction of signals stored thereon have been described in detail in the Japanese literature "CD—From Audio to Personal Computer" written by Kenji Hayashi and published from Corona Ltd. on Jul. 25, 1990. Moreover, description has been given in detail of compression of video and audio signals in the Japanese literature "New Moving Picture Expert Group (MPEG) Text" written by Hiroshi Fujiwara and published from ASCII Ltd. on Aug. 1, 1994.

In the former, to add error correction codes to data beforehand continuously written on a compact disk (CD), there have been described a CD error correction method in which first and second error correction codes are added thereto and an oblique interleaving not completing in a block (block-incomplete interleaving) is carried out to convert data arrangement by changing the amount of delay in relation to the first and second correction codes for each data and a CD-ROM (read-only memory) signal recording method in which a CD for storing thereon audio signals is employed for data application. Additionally, according to the latter, there have been described a method of compressing video and audio signals and a method of multiplexing the compressed signals. In accordance with these articles, although compressed video and audio signals are recorded on the media and computer user data is recorded thereon in a data application, there has not been described any method of efficiently recording the signals and data on the media.

SUMMARY OF THE INVENTION

As described in the "CD—From Audio to Personal Computer", data reproduced from a compact disk of a CD player is subjected to an error correction using a first error correction (C1) code, an oblique block-incomplete interleaving i.e., oblique interleaving not completing in a block to transform the data arrangement by changing the amount of delay for each data, and an error correction using a second error correction (C2) code, thereby producing output data. In consequence, the error correcting capability is improved by the interleaving process. Furthermore, even when an error occurring in successive positions on a disk cannot be corrected, the error is dispersed in the output data since the data output order is different from the sequence of data on the disk. Therefore, for audio data, such an error can be appropriately interpolated according to data items respectively before and after the wrong data. However, when compressed video data is to be recorded on a disk, the correction using data interpolation according to the preceding and succeeding data items cannot be employed. On the contrary, if the interpolation is applied to this situation, the range of the error is disadvantageously expanded in the output data. This problem can be coped with as follows. For data recorded on a disk in a sequence of the first correction code series, an error correction is accomplished using the first correction code. An oblique block-incomplete interleaving operation is performed for the resultant data. An error correction is then carried out using the second correction code for the interleaved data after second error correction, the data is outputted in an order of the first correction code series, thereby producing data in a sequence equivalent to the time series of the original data before the encoding operation thereof. When recording the data, the encoding process is achieved in a sequence opposite to the order above. However, when the technology is adopted for a data application in a computer or the like, since the error correction is effected according to a C2 code for a particular data block to be reproduced, it is required to reproduce the entire data of the data blocks in a range of the interleaving process. If the code length is small, the period of time to reproduce data in the range is quite small and hence the influence of the data reproduction upon the data access time is in a negligible range. However, to decrease redundancy of the code, if the code length is increased, the elongated reproduction time will exert an adverse effect on the data access time. Furthermore, video data has a large volume also in the compressed state. Consequently, to record such video data on a disk having a restricted capacity, it is required to reduce redundancy of codes representing the video data. However, when the code length employed in code correction is elongated and hence the block unit in which the correction code is completed is increased to take a value which is several times that of the sector (2048 bytes) used as the standard data unit in computers, the data recording and reproducing operations can be accomplished only in the block unit in which the correction code is completed. In addition, another problem arises even though error correction codes are added to complete in an error block. Resultantly, when writing data of one sector on a disk available for data recording and reproducing operations, it is necessary to write data of one block including the one-sector data and dummy data. In consequence, when the data read and write operations are carried out in a smaller unit (e.g., in the unit of one sector), there arises a problem that the recording capacity is increased and there appear a large number of unused areas on the disk.

In addition, when video and/or audio signals compressed in a data stream format including a 188-byte transport packet as described in the "New MPEG Text" are recorded on a CD-ROM employed as computer data recording media, since each sector of the CD-ROM includes, e.g., 2048 bytes and the basic data capacity of other computer data recording media is similarly represented in the unit of a power of two, if the video and/or audio signals are recorded in all user areas to increase the recording efficiency, some transport packets will be distributively written in some mutually different sectors. This disadvantageously results in complexity of the data reproducing operation. On the other hand, to simplify the data processing, if a plurality of transport packets are written in one sector and the unused data area of the sector are regarded as an invalid area, there will arise a problem of decrease in the data recording efficiency.

The above problem related to the data access efficiency and the unused recording capacity in the disk available for recording and reproducing operations can be solved as follows. Data items inputted in a time series are equally subdivided into data blocks each including an identical number of data items. Appended data is then added to each data block to configure a SYNC block to which a synchronizing code is added so as to form one sector including c SYNC blocks (c is a natural number). There is configured a correction block including p sectors. The correction block is subdivided into C1 and C2 data blocks to which a first error correction code and a second error correction code are respectively added, thereby recording the data items inputted in a time series with the sequence thereof kept unchanged.

The above difficulty associated with inconsistency between the processing of video and audio signal and the data application can be solved by the following process. Using c main data portions of the SYNC blocks (c is a natural number), there is formed a sector unique to the media in which the appended data is conclusive in the sector unit. The sector capacity is set to a power of two and an integral multiple of the transport stream capacity is more than the sector capacity and is less than the total of the sector capacity and appended data of p blocks.

Additionally, information indicating a position of description of a sector address is added to each SYNC block and the sector address denoting a number assigned to a sector is added according to the position describing information, which facilitates reproduction of desired data.

Since the error correction code is completely stored in n C1 correction blocks, data of an objective sector can be reproduced by conducting the data reproduction through the n C1 correction blocks.

Furthermore, a predetermined number of transport streams recorded on the media includes in any situation sector main data unique to the media and appended data configured in the sector unit. Namely, the transport stream cannot be distributevily recorded in a plurality of sectors, and a sector address is assigned to each sector, which consequently facilitates the data access operation.

BRIEF DESCRIPTION OF THE DRAWINGS

These and other objects and advantages of the present invention will become apparent by reference to the following description and accompanying drawings wherein:

FIG. 10 is a flowchart showing an information reproducing method in a 10th embodiment of the present invention;

FIG. 11 is a diagram showing the format employed in an information recording method of the eighth embodiment according to the present invention;

FIG. 12 is a diagram showing the format employed in an information recording method in an 11th embodiment according to the present invention;

FIG. 13 is a diagram showing the format which may be employed in place of the recording format of FIG. 11 in the eighth embodiment according to the present invention.

DESCRIPTION OF THE PREFERRED EMBODIMENTS

Figure 1:
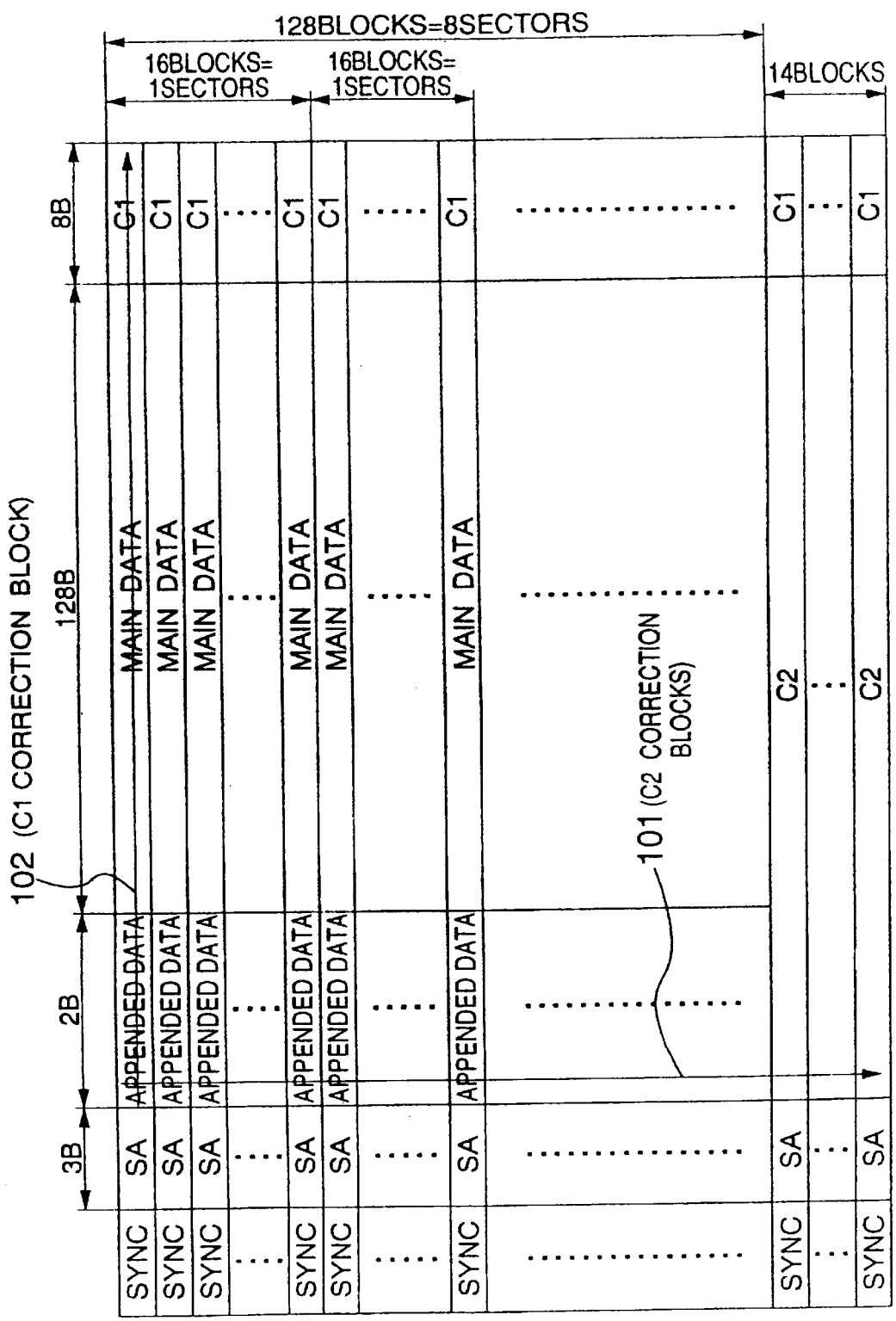
FIGS. 1 to 7 are schematic diagrams respectively showing the formats employed respectively in first to seventh embodiments of the information recording method according to the present invention.

Referring to FIG. 1, description will be given of a first embodiment of the present invention. FIG. 1 is a recording format of recording information in the first embodiment according to the present invention. This diagram specifically shows the data arrangement of one correction block. In FIG. 1, SYNC indicates a synchronizing signal designating the first position of a SYNC block, SA denotes a sector address indicating a number assigned to a sector, appended data is information added to main data to indicate, for example, a feature of the main data, "main data" is primary record information, C2 stands for a second error correction code (to be abbreviated as a C2 code herebelow) added to the appended and main data, and C1 indicates a first error correction code (to be abbreviated as a C1 code herebelow) added to the appended and main data. Main data inputted thereto in a time series is subdivided into 128-byte (indicated as 128B in FIG. 1) units and then 2-byte (2 B) appended data is added to each 128-byte unit, thereby producing 128 rows (128 blocks in FIG. 1). Gathering one byte at an identical position of each row including 130 (128+2) bytes of data, there is created a 14-byte C2 code to resultantly configure a C2 correction block. The 14-byte C2 code is arranged in the direction denoted by an arrow 10. Resultantly, the obtained C2 codes constitute 14 130-byte rows (14 blocks in FIG. 1). Added to each of 142 (128+14) 130-byte rows is an 8-byte C1 code so as to construct a C1 correction block (designated by an arrow 102). As a result, for the appended data including 128 rows by 2 bytes and main data including 128 rows by 128 bytes, there are generated 130 C2 blocks and 142 C1 blocks. Furthermore, 16 successive C1 correction blocks constitute one sector. Therefore, the sector contains 2048 (128×16) bytes of main data. Each sector of data to be recorded on a disk is assigned with a number (sector address) unique thereto. Namely, a 3-byte sector address is added to each C1 correction block together with a synchronizing signal SYNC so as to form a SYNC block. As above, there is configured a correction block which makes it possible to conclusively achieve the C1 and C2 corrections in the unit of 128×128 bytes of main data. The data items are written on the media in a sequence beginning at the highest SYNC block and ending with the lowest SYNC block. In this connection, data is sequentially written in each SYNC block in a direction beginning at the left-most position thereof.

According to the first embodiment, in an operation to reproduce data stored in an objective sector of a disk, it is only necessary to conduct the data reproduction for the correction blocks containing the pertinent sector. As a result, the desired data in the sector can be decoded and converted into output data at a high speed. Moreover, since a sector address is added to each SYNC block, the target sector can be readily decided and hence data of the sector can be outputted at a high speed. Additionally, the data continuously inputted in a time series is only subdivided to form the C1 correction block with the sequence of data kept unchanged. Consequently, when the data is corrected in the reproducing stage according to the C1 code to output the corrected data in the processed sequence, the resultant data is outputted in a sequence identical to that of input data recorded on the disk. When compared with the error correction of data according to the C2 code, the C1 code error correction enables the output data to be produced at a higher speed, leading to an advantageous effect of facilitating implementation of such special reproducing operations as a variable-speed data reproduction and a reverse data reproduction. Incidentally, in the description of the first embodiment, the appended data, C1 code, C2 code, sector address, and synchronizing signal are added to main data in this order. However, to attain the advantage above, the operation sequence may be varied only if the relationships between the respective codes and signals shown in FIG. 1 are kept unchanged. Furthermore, the C1 code is added to the appended data, whereas the C1 code is not provided for the sector address. In this regard, the same advantageous effect, is attainable regardless of presence or absence of the C1 code for the appended data and sector address. In addition, although the appended data is disposed on the left of the main data, the effect above can be obtained even when the appended data is arranged at an intermediate point or on the right thereof. Similarly, to attain the same advantage, the C1 code, which is on the right of the main data in the first embodiment, may be positioned at a middle point or on the right of the main data. The C1 correction blocks each including the C2 code are disposed in the last 14 blocks of one correction block. To achieve the above effect, however, the C1 blocks may be arranged at an intermediate position or before the other 128 C1 correction blocks. In addition, the numbers respectively of bytes, blocks, and sectors of FIG. 1 may also be appropriately altered to attain the same advantage.

Figure 2:
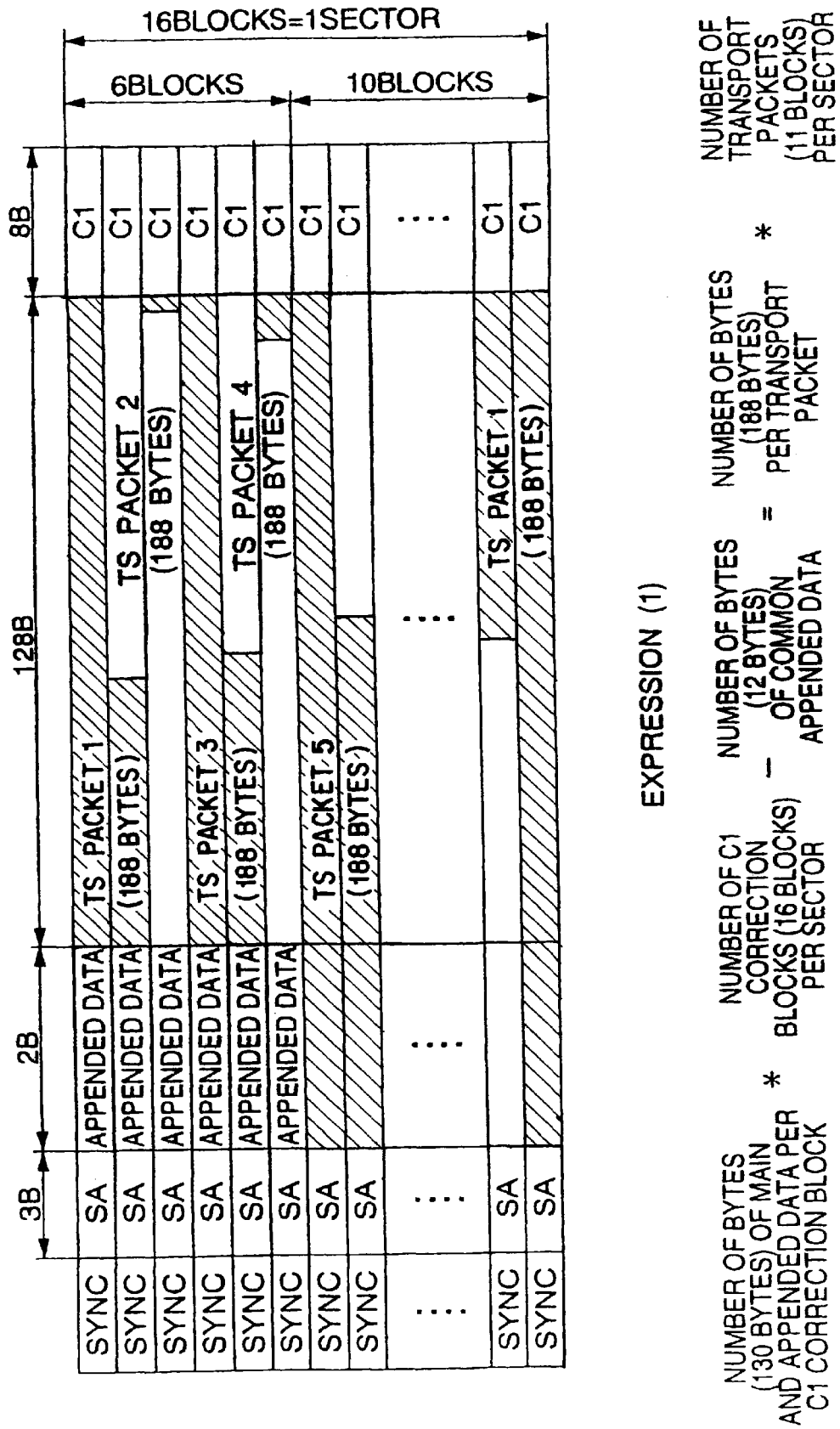

Referring next to FIG. 2, description will be given of a second embodiment of the present invention. FIG. 2 shows the layout of the correction block of FIG. 1 corresponding to one sector. In this diagram, the contents respectively of SYNC, SA, C1, and appended data are the same as those of FIG. 1. Furthermore, it is assumed that C2 codes are also added thereto as in FIG. 1. Each transport (TS) packet shown in this diagram has a fixed length and includes data items such as video signals represented in the compressed form. In FIG. 2, the main data includes a transport packet. In FIG. 1, the appended data in one sector, namely, 16 blocks includes 32 bytes. In FIG. 2, the 12-byte area for six blocks is allocated as common appended data area and is not directly related to the input data. Ten remaining blocks, namely, a 20-byte area is assigned as an area to store therein appended or main data according to the input data. Specifically, the main data is recorded therein when the main data is in the configuration of the transport packet. The appended data is additionally recorded therein in other cases.

As above, in accordance with the second embodiment, when the main data is in the form of the transport packet, the area in which the main data is recorded satisfies Expression (1) as shown in FIG. 2 and hence an integral multiple of transport packets can be exactly recorded in the area. Additionally, thanks to provision of the common appended data area independent of the format of main data, the data can be efficiently written on the recording media irrespective of whether or not the main data is in the configuration of the transport packet. Moreover, in case where the common appended data area of FIG. 2 is used to record therein a code indicating whether or not the main data is in the form of the transport packet, the data reproduction can be appropriately carried out for disks in both of the data configurations above. This advantage is also obtained even when the data layout varies between the sectors of the disk. Even if the numeric values shown in the embodiment is changed, the same advantage is obtainable only if the condition of Expression (1) is satisfied.

Figure 3:
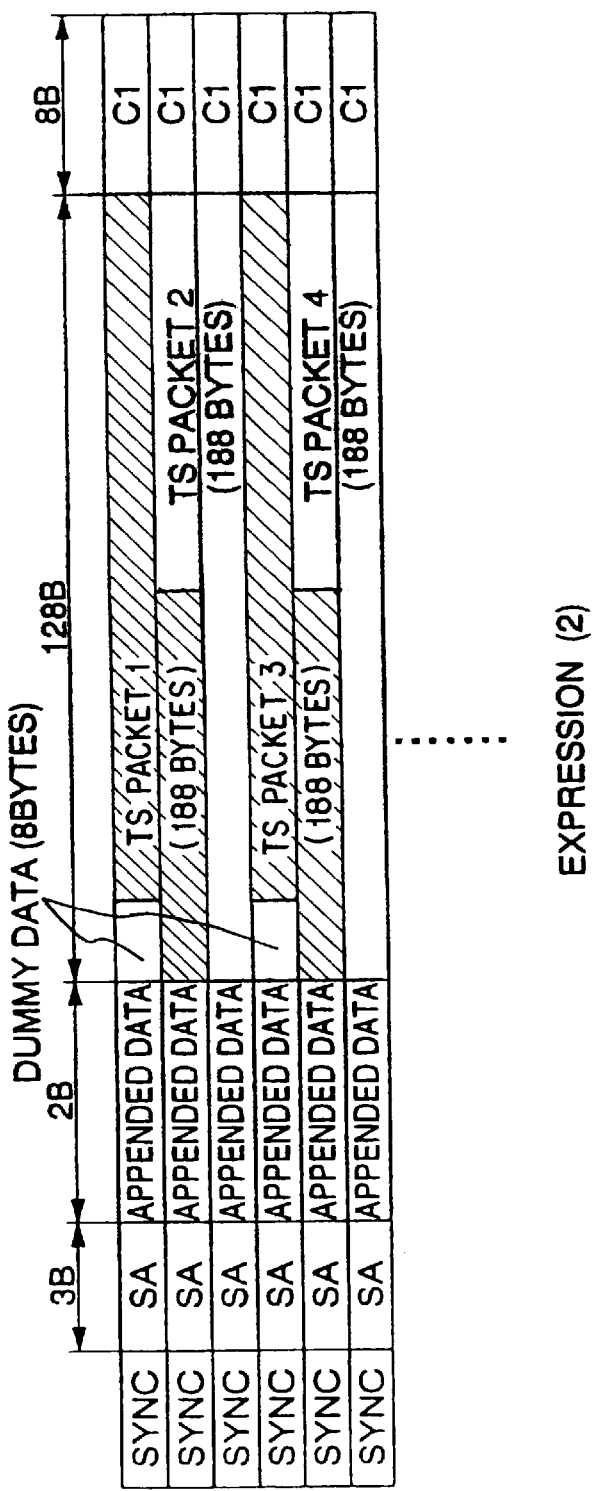

Referring subsequently to FIG. 3, description will be given of a third embodiment according to the present invention. FIG. 3 shows the data layout of the correction block of FIG. 1 corresponding to six SYNC blocks. In this diagram, SYNC, SA, C1, and appended data represent the same items as those of FIG. 1. In addition, C2 codes are assumed to be also added thereto as in FIG. 1. Each transport packet of FIG. 3 is configured in the same way as for that of FIG. 2. When recording transport packets in this embodiment, m (a natural number; two in this case) transport packets are written in the main data area for every n (a natural number; three in this case) SYNC blocks. Written in eight-byte remaining portion of the main data area is dummy data not having significance. According to the embodiment, the data can be efficiently written on the recording media regardless of whether or not the main data is in the configuration of the transport packet. Moreover, when the common appended data area of FIG. 2 is used to write therein a code indicating whether or not the main data is in the form of the transport packet, the data reproduction can be appropriately carried out irrespective of the data configuration. In addition, although it is required to detect the period of n SYNC blocks, timing information may be recorded in place of the dummy data or may be recorded as a portion of the sector address or appended data. The numeric values of the third embodiment may be varied only if the condition of Expression (2) as shown in FIG. 3 is satisfied.

Figure 4:
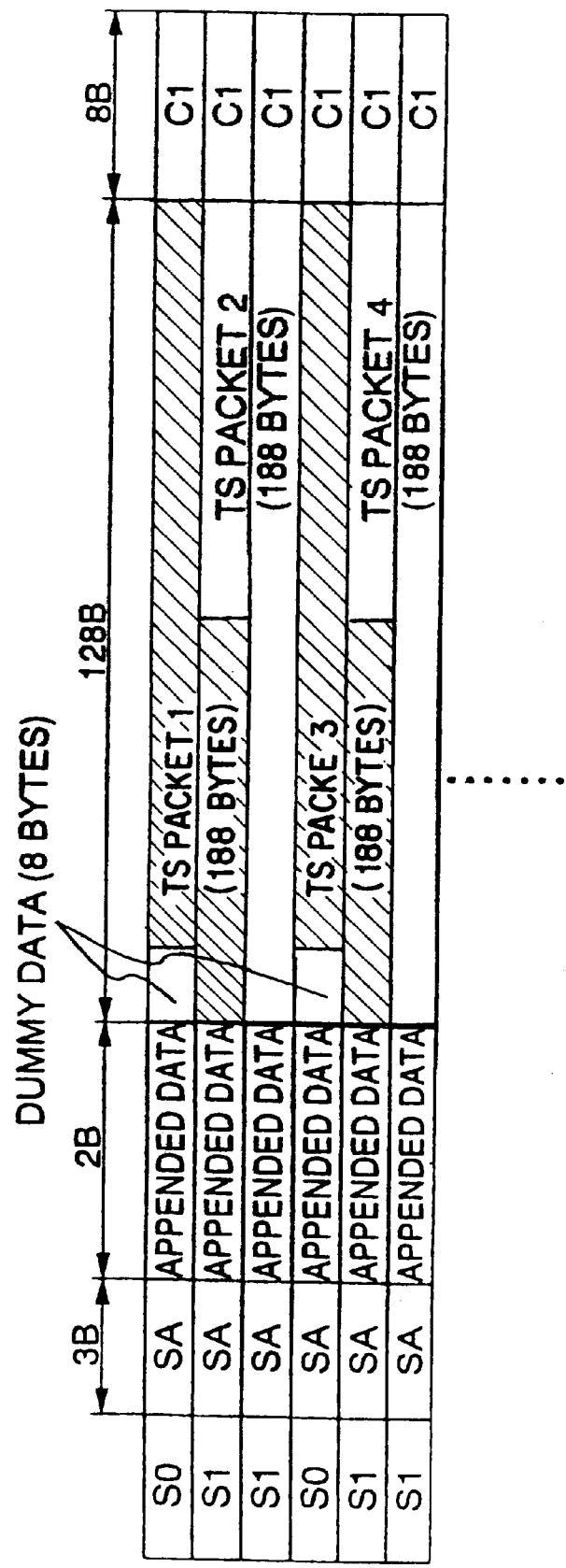

Referring now to FIG. 4, description will be given of a fourth embodiment of the present invention. Excepting S0 and S1, the constituent elements of FIG. 4 are the same as those of FIG. 3. Reference symbols S0 and S1 of FIG. 4 indicate synchronizing signals having mutually different patterns. Signals S0 and S1 are added to each SYNC block. The pattern of S0 appears for every n SYNC blocks. Consequently, such decoding operation as a data correction and the detection of the transport packet can be correctly achieved.

Figure 5:
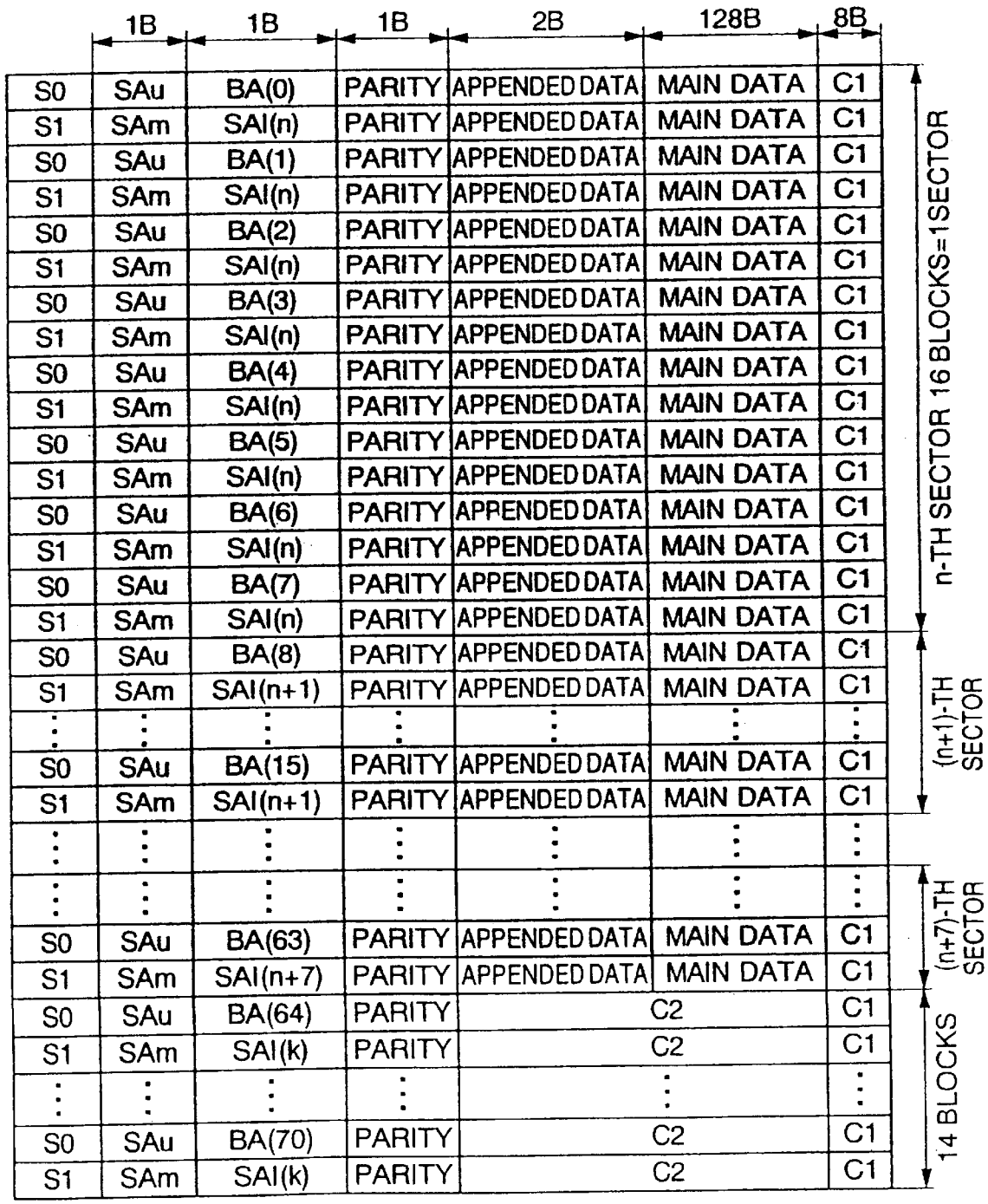

Subsequently, a fifth embodiment of the present invention will be described with reference to FIG. 5. FIG. 5 shows in detail the SYNC and SA fields of FIG. 1. The appended data, main data, C1 code, and C2 code are the same as those of FIG. 1. SAu, SAm, and SA1 collectively denote a 3-byte sector address. Namely, SAu, SAm, and SA1 respectively indicate an upper-most address, an intermediate address, and a lower-most address thereof. The sector address is written eight times for each sector. FIG. 5 shows data of sectors ranging from the n-th sector to the (n+7)-th sector. The parenthesized value appended to SA1 designates a sector address represented by SAu, SAm, and SA1. BA stands for a number assigned to a SYNC block in the correction block. The associated value in the parentheses thereof indicates by way of example a numeric value assigned to each two-block unit, namely, a one-block address is assigned to every two blocks. The sector address added to the SYNC block in which the C2 code is recorded may be assigned in an arbitrary manner if the sector address is other than any sector address assigned to the main data. In FIG. 5, a particular natural number k is assigned to each SYNC block including the C2 code. Furthermore, there may be assigned in place of a block address a code which makes it possible to discriminate the first SYNC block of the correction block or a synchronizing signal having a particular pattern unique to the first SYNC block. The parity code is related to a group of SAu and BA or a group including SAm and SA1. S0 and S1 are synchronizing signals indicating the first position of each SYNC block. These signals have mutually different patterns in which S0 denotes a recording cycle of the sector address. A SYNC block including S0 is considered to include SAu and BA and a SYNC block in which S1 is written is assumed to contain SAm and SA1.

As above, according to the embodiment, sector address information can be appropriately decided at a high speed without decoding the C1 code and hence the data access speed is increased. Although the sector address includes three bytes and the block address (BA) is of one byte and is written for every second blocks in this embodiment, the present invention is not restricted by these values. Moreover, thanks to addition of parity also to the block address, the precision of positional information of the block address is improved. In addition, the precision of sensing the sector address and precision of correcting data according to the C2 code can be improved. Furthermore, data successively inputted in a time series is only subdivided to form C1 blocks with the input sequence thereof kept unchanged. Consequently, in the data reproduction, when the data is corrected according to the C1 code and then is outputted in the processing sequence, the order of recording the input data is retained in the data outputting operation. Thanks to this provision, in addition to the advantage that the sector address can be appropriately sensed at a high speed, the data can be outputted at a higher speed when compared with the case in which the C2 code is also used to correct the data. This leads to an advantageous effect of facilitating the special data reproduction such as a variable-speed data reproduction and a reverse data reproduction.

Figure 6:
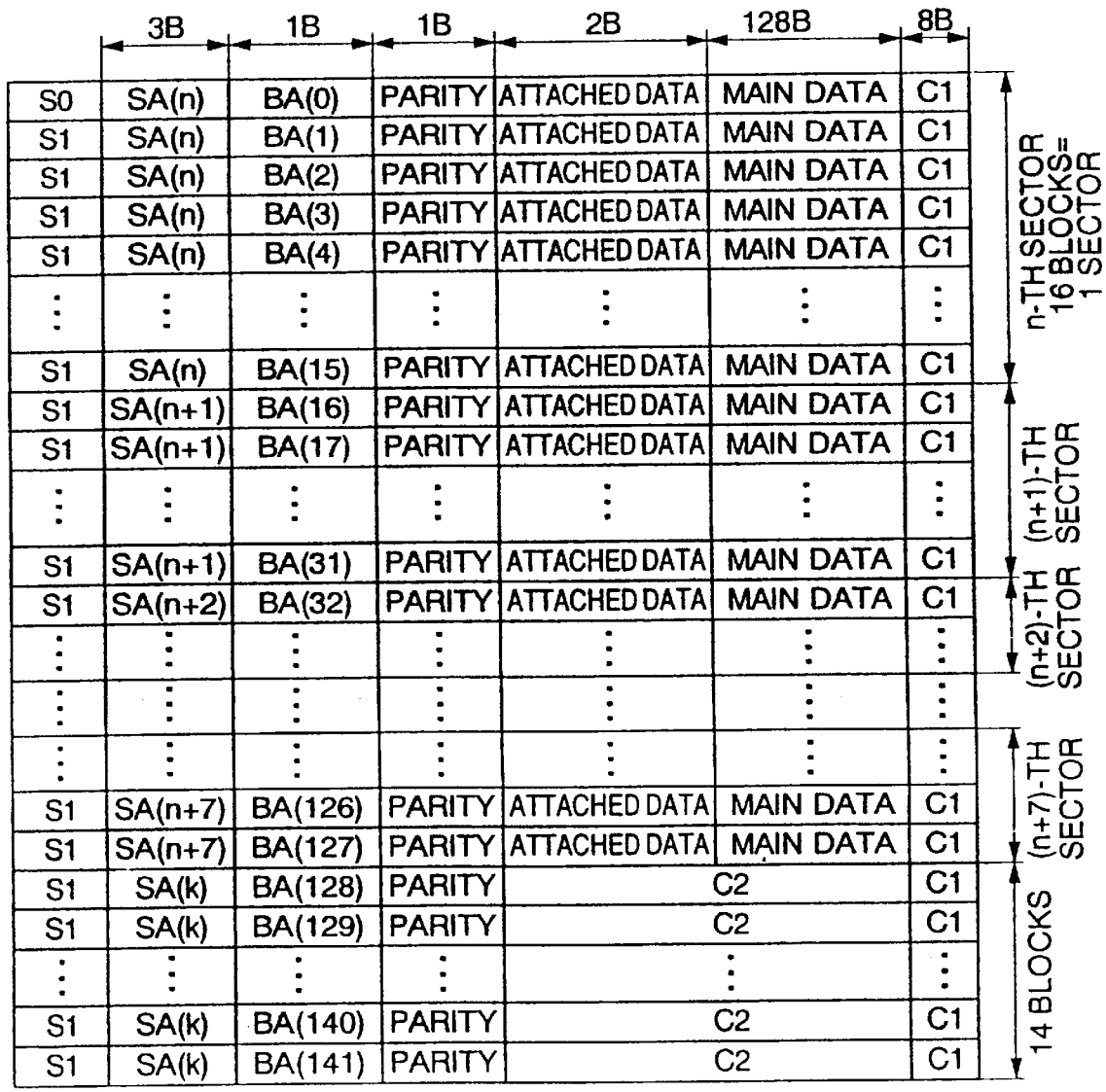

Next, description will be given of a sixth embodiment of the present invention with reference to FIG. 6. This diagram shows in detail the SYNC and SA fields of FIG. 1. The constituent elements other than S0, S1, SA, BA, and parity are the same as those of FIG. 5. SA denotes a sector address and is written 16 times for each sector. FIG. 6 shows data from the n-th sector to the (n+7)-th sector in which the parenthesized value appended to SA designates a sector address. BA stands for a number assigned to a SYNC block in the correction block. The value in the parentheses of BA indicates by way of example a numeric value of a one-block address for each block. The sector address added to the SYNC block in which the C2 code is recorded may be assigned in an arbitrary manner if the sector address is other than any sector address of the main data. In FIG. 6, a particular natural number k is assigned to each SYNC block including the C2 code. The parity code is related to 3-byte SA and 1-byte BA. S0 and S1 are synchronizing signals indicating the first position of each SYNC block. These signals have mutually different patterns in which S0 denotes the first position of the correction block.

As described above, in accordance with the embodiment, information of sector addresses can be appropriately determined at a high speed without decoding the C1 code and therefore the data access speed is increased. Thanks to the synchronizing signals and block addresses, the first position of the correction block can be detected with high reliability. Although the sector address includes three bytes and the block address (BA) is of one byte in this embodiment, the present invention is not restricted by these values. Moreover, since the first position of the correction block can be decided according to the types of synchronizing signals, the similar advantage is attainable even when the block address is missing. Conversely, with provision of block addresses, it is possible to detect the first position of the correction block, and the same advantage is obtained without discriminating the synchronizing signals S0 and S1 from each other. Additionally, thanks to provision of parity also for the block address, the precision of positional information indicated by the block address is improved. In addition, it is also possible to improve the precision of sensing the sector address and the precision of correcting data according to the C2 code. Furthermore, data successively inputted in a time series is only subdivided to construct C1 blocks with the input sequence thereof kept unchanged. Consequently, in the data reproduction, when the data is corrected according to the C1 code and then is outputted in the processing sequence, the input data recording order is retained in the data outputting operation. Thanks to this provision, in addition to the advantage that the sector address can be appropriately sensed at a high speed, the data can be outputted at a higher speed when compared with the case in which the C2 code is also used to correct the data. This leads to an advantageous effect of facilitating such special data reproduction as a variable speed data reproduction and a reverse data reproduction.

Figure 7:
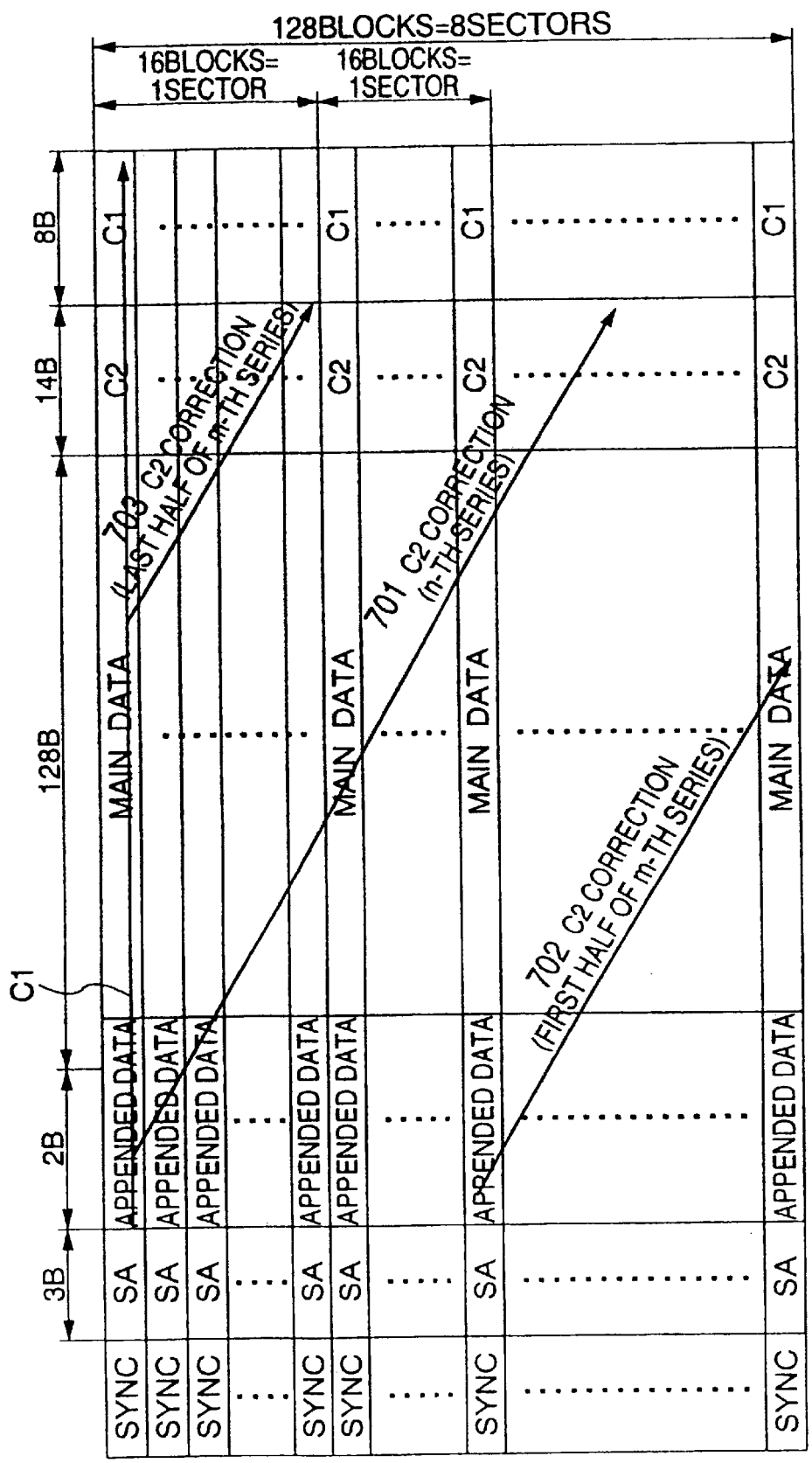

Referring next to FIG. 7, description will be given of a seventh embodiment of the present invention. FIG. 7 shows the format of data arrangement of one correction block employed in the recording method of the seventh embodiment. Since the difference between FIG. 7 and FIG. 1 resides only in the operation to add C1 and C2 codes to the data, description of the other constituent elements will be avoided. Although the C1 and C2 correction blocks include only data of one correction block as in FIG. 1, there is used another way of collecting the constituent data items. The data gathering method will be described. Collecting data with a delay of p (p: natural number other than 130 (bytes) which is the total of one row of appended and main data) from the appended and main data configured in the same fashion as for FIG. 1, there is configured a C2 correction block. Added thereto is a 14-byte C2 code. For example, the n-th C2 correction block is indicated by arrow 701 in the diagram. Moreover, when such an arrow is drawn from the left end to the bottom end thereof in place of the right end as indicated by arrow 702 in FIG. 7, the arrow is folded to be continuously drawn as indicated by arrow 703. Namely, the data collecting operation is continued along arrows 702 and 703 to resultantly obtain a C2 collection block. Thereafter, an 8-byte C1 code is added to each row thereof to construct a C1 correction block as a result. Added to each C1 block are a sector address and a synchronizing signal in a manner similar to that of FIG. 1, thereby forming one correction block. Data items are written on the recording media in the same way as for FIG. 1.

According to the embodiment, data of an objective sector can be reproduced at a high speed equivalent to that developed for the data arrangement of FIG. 1. Additionally, as compared with the case of FIG. 1, the code redundancy of the seventh embodiment can be lowered by the SYNC, SA, appended data, and C1 code of the SYNC block in which the C2 code is recorded. Furthermore, since data successively inputted in a tire series is only subdivided to construct C1 blocks with the input sequence thereof kept unchanged, when the data is corrected, in the data reproduction, according to the C1 code and is then outputted in the processing sequence, the recording order of the input data is retained in the data outputting operation. Due to this provision, in addition to the advantage that the sector address can be correctly sensed at a high speed, the data output speed can be increased when compared with the case in which the C2 code is also used to correct the data. This results in an advantageous effect of facilitating such special data reproduction as a variable-speed data reproduction and a reverse reproduction. Incidentally, each of the embodiments respectively shown in FIGS. 2 to 6 is applicable also to the seventh embodiment.

Figure 8:
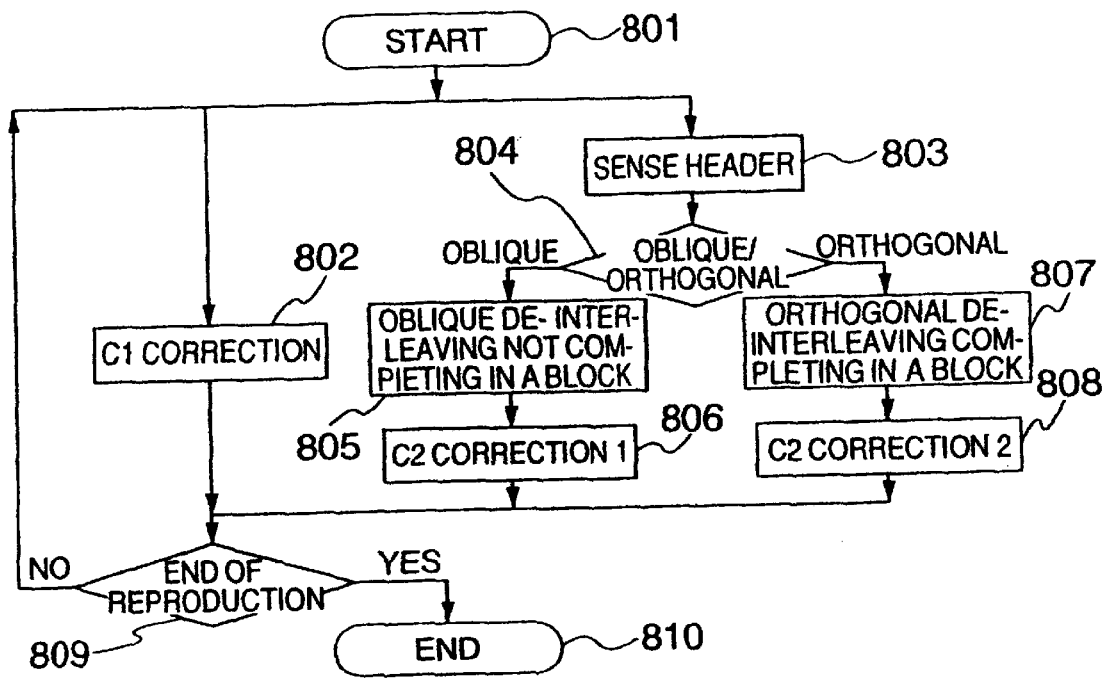
FIG. 8 is a flowchart showing an information reproducing method in an eighth embodiment of the present invention.

Subsequently, an eighth embodiment of the present invention will be described with reference to FIGS. 8 and 11. FIG. 8 is a flowchart showing a method of reproducing data on a disk according to the eighth method and FIG. 11 shows by way of example the format of an oblique data interleaving procedure used in the method. In FIG. 8, reference numeral 802 indicates a C1 error correction process and numeral 803 denotes a step of detecting header information added to each block or each group of blocks. The header information is recorded as portion of, e.g., the appended data or sector address. In this connection, the header information includes a code designating a method of interleaving the recorded signals. Numeral 804 indicates a step of examining the header information to decide that the interleaving type is an orthogonal block-complete type or an oblique block-incomplete type, numeral 805 denotes an oblique block-incomplete de-interleaving process, numeral 807 represents an orthogonal block-complete de-interleaving process, and numerals 806 and 808.each represent a C2 error correction step of correcting errors according to the C2 code added to the pertinent data. Numeral 809 indicates a processing step to decide the end of data reproduction. In an example of the orthogonal block-complete interleaving process, C2 codes are added to the data as shown in FIG. 1. FIG. 11 shows an example of the oblique block incomplete interleaving process. This diagram changes from FIG. 7 only in the arrangement of the C2 correction block. As in FIG. 7, data is gathered with a delay of p (p: natural number other than 130 (bytes) which is the total of one row of appended and main data) from the appended and main data configured in the same fashion as for FIG. 7, thereby producing a C2 correction block. Thereafter, a 14-byte C2 code is added to the block. However, there is not employed the operation conducted along the folded line shown in FIG. 7. In consequence, the arrangement of FIG. 11 is different from FIGS. 1 and 7 in that such correction blocks terminating respectively with the C1 and C2 blocks are missing. Therefore, to decode data of a desired sector, it is necessary to reproduce also data, which is not required to be outputted, for the C2 correction. However, the folded process of FIG. 7 is unnecessary. In the C2 correction steps 806 and 808, the C2 corrections are respectively effected for the data of C2 blocks respectively gathered by the de-interleaving processes 805 and 807. The loop of C1 error correction and that of de-interleaving and C2 error correction are concurrently or sequentially performed. Additionally, although the C1 correction step 802 is basically common to both interleaving processes, when the block data varies in the number of bytes, there is achieved a change-over operation to transfer the control to an operation step associated thereto.

According to the embodiment described above, even when the oblique block-incomplete interleaving is conducted for the compressed video signals to be successively reproduced and the orthogonal block-complete interleaving process in which data can be accessed in the sector unit at a higher speed is accomplished for the application data in the computer or the like, the stored data can be appropriately reproduced. In this regard, the record format of FIG. 11 need not be necessarily used in the orthogonal block-complete interleaving operation as described in conjunction with the eighth embodiment. Namely, only the record format can be effectively employed as an independent element according to the present invention. Furthermore, the format can be efficiently adopted in the combination with each of the embodiments described in relation to FIGS. 2 to 6. Namely, only the addition of correction codes of FIG. 11 is accomplished in FIGS. 2 to 6. Additionally, there may be adopted an oblique interleaving method of FIG. 13 in place of that shown in FIG. 11. FIG. 13 is different from FIG. 11 only in that the C1 code is included in the C2 correction block. Moreover, according to the data reproduction method of the embodiment, for either one of the interleaving methods, when the data is corrected according to the C1 code to be outputted without changing the sequence of data items, the input data order can be retained in the output operation. In addition to the advantageous effect that the sector address can be appropriately decided at a high speed, the data can be outputted at a higher speed as compared with the case using the C2 code also for the data correction. This leads to an advantage of facilitating special data reproductions such as a variable-speed data reproduction and a reverse data reproduction. The oblique interleaving method of FIG. 13 may be partly modified such that the input data is arranged in a time series according to the arranging order of the lines of C2 correction blocks. Although the advantageous capability of data reproduction only with the C1 correction is lost in this case, the modified method is applicable also to the eighth embodiment. Moreover, when used in combination with each of the embodiments respectively related to FIGS. 2 to 6, the above method leads to an advantage similar to that of the eighth embodiment, for example, in the sector detection as well as in the data recording efficiency when recording data in the transport packet configuration.

Figure 9:
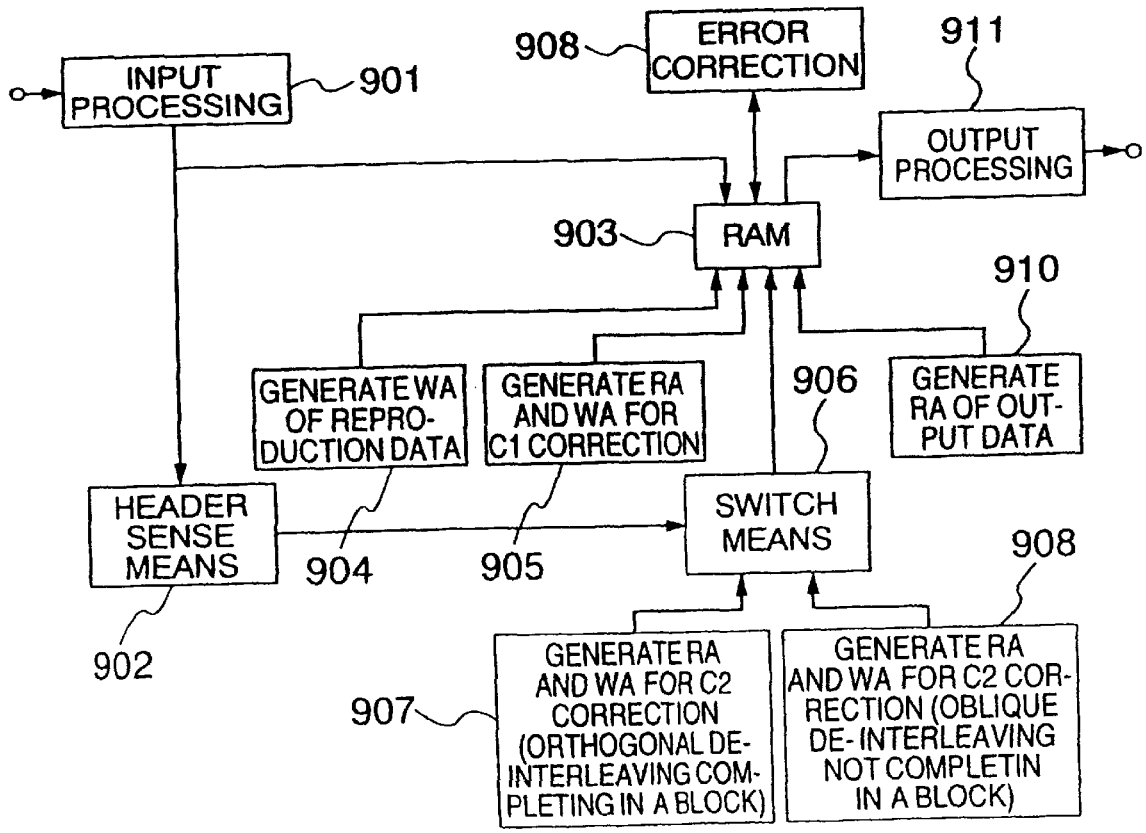
FIG. 9 is a block diagram showing the configuration of an information reproducing apparatus in an eighth embodiment according to the present invention.

Referring subsequently to FIG. 9, description will be given of a ninth embodiment according to the present invention. FIG. 9 shows in a block diagram a data reproducing apparatus in the ninth embodiment of the present invention. In the description of the embodiment, the orthogonal block-complete and oblique block-incomplete interleaving operations are assumed to be conducted according to the data formats of FIGS. 1 and 11, respectively. Reference numerals 901 to 903 designate input process means, header sense means, and a random access memory, respectively. Numeral 904 indicates means for generating a write address for reproduction data, numeral 905 represents means for creating read and write addresses for C1 error correction, numeral 906 denotes switching means, numeral 907 indicates means for generating read and write addresses for C2 error correction associated with orthogonal block-complete de-interleaving, numeral 908 indicates means for generating read and write addresses for C2 error correction associated with oblique block-incomplete de-interleaving, numeral 909 indicates error correction means for achieving C1 and C2 error corrections, numeral 910 represents means for creating a read address of output data, and numeral 911 denotes output process means. The input process means 901 conducts decoding and synchronization sensing operations for signals inputted thereto and writes the obtained input data in the RAM 903. In this operation, a write address is created by the address generating means 904. In addition, the sense means 902 detects a header of the input data and selects the address creating means 907 or 908 according to information of the header. The address generating means 905 creates addresses respectively used to read data from the RAM 903 to the error correction means and to write data from the means 909 in the RAM 903. Incidentally, since the C1 block structure is basically common to these two-types of interleaving methods, the address generated from the means 905 need not be subjected to a change-over operation according to the pertinent interleaving mode. However, when the number of bytes thereof is changed, there is conducted a switching operation to pass control to an associated process. Each of the means 907 and 908 controls the data reading or writing sequence such that the means 909 achieves the error correction in the C2 block unit shown in FIG. 1 or 11, thereby performing the pertinent de-interleaving operation. The change-over means 906 is responsive to a switching signal from the header sense means 902 to select the address from the means 907 or 908. After the C2 error correction is carried out, data is read from the RAM 903 according to the read address from the means 911 regardless of the operation mode, namely, in the data sequence employed when the data is recorded on the disk. The obtained data is then fed to the output means 911 to be outputted therefrom in the sector unit.

According to the ninth embodiment, there is materialized a data reproducing apparatus implementing the data reproduction method related to the eighth embodiment.

Referring next to FIG. 10, description will be given of a tenth embodiment according to the present invention. FIG. 10 is a flowchart showing a method of reproducing data on a disk in the tenth embodiment. FIG. 10 is different from FIG. 8 only in steps 1001 to 1003 associated with detection of the interleaving method and hence only the processing of this portion will be described.

Reference numeral 1001 indicates a sector table read process to read from a particular area of the disk a correspondence table including a correspondence between sector addresses and interleaving modes. Numeral 1002 denotes a step to detect a sector address, numeral 1003 is a step to select an interleaving process according to the table obtained in step 1001 and the sector address detected in step 1002. The other processing steps are substantially the same as those of FIG. 8.

According to the tenth embodiment, since the interleaving mode is beforehand recognizable for each area on the disk, the advantageous effect of the processing procedure of FIG. 8 can be easily obtained.

Referring next to FIG. 12, an 11th embodiment of the present invention will be described. FIG. 12 is a flowchart showing a method of recording data on a disk in accordance with the 11th embodiment of the present invention. In the description of the embodiment, there will be employed the orthogonal block-complete interleaving and oblique block-incomplete interleaving respectively of FIGS. 1 and 11 by way of example. In FIG. 12, reference numeral 1101 indicates a step to select the orthogonal block-complete interleaving or oblique block-incomplete interleaving, numeral 1104 is a step to conduct the oblique block-incomplete interleaving, numeral 1102 denotes a step to accomplish the orthogonal block-complete interleaving, each of numerals 1105 and 1103 represents a step to add the C2 code to the pertinent data, numeral 1106 is a step to add a header to the data, and numeral 1107 indicates a step to add a C1 code to the data. In step 1101, the oblique block-incomplete interleaving is selected when the record data includes, e.g., compressed video and audio signals; whereas, orthogonal block-complete interleaving is chosen when the data is, for example, data stored for computers or the like. When the oblique block-incomplete interleaving is assumed in step 1101, a C2 block is configured as shown in FIG. 11 in step 1104. In step 1105, a data correcting operation is conducted for the obtained data, thereby completing the oblique block-incomplete interleaving for the input data. When the orthogonal block-complete interleaving is chosen in step 1101, a C2 block is created as shown in FIG. 1 in step 1102 to be thereafter subjected to a data correction in step 1103, thereby completing the orthogonal block-complete interleaving for the input data. In step 1106, a code indicating that the pertinent sector is associated with the oblique or orthogonal interleaving is added as the header. Step 1107 of adding C1 codes is basically common to any data. However, when the number of bytes varies between the C1 blocks in either interleaving modes, control is transferred to an appropriate process. Incidentally, the processing loops respectively of adding C1 and C2 codes are executed concurrently or sequentially. In step 1106, there is executed an operation as shown in FIG. 12 when the header includes SA and the C2 code is not added as shown in FIGS. 1 and 11. However, when the header is recorded together with the C2 code as appended data, the process of step 1106 is executed immediately after step 1101.

According to the 11th embodiment, there can be implemented a disk data reproducing apparatus in which data of a target sector of the disk can be reproduced at a high speed and compressed video signals and the like on the disk can also be reproduced. Moreover, the objective data including only compressed video signals or the like can be recorded on the disk so that the recorded signals are reproduced by an apparatus of a simple configuration.

Figure 14:
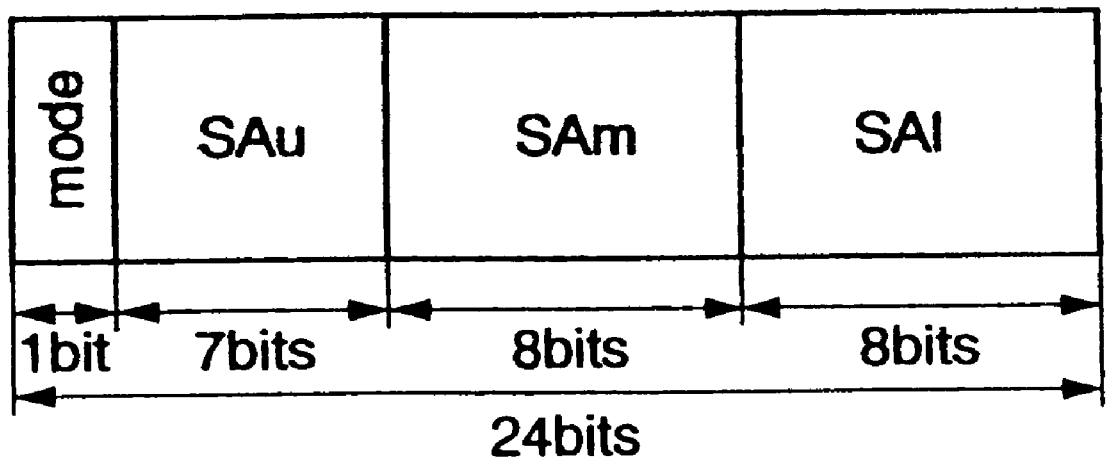
FIG. 14 is a diagram showing the format utilized in the information recording method of the 12th embodiment according to the present invention.

Referring next to FIG. 14, description will be given of a 12th embodiment according to the present invention. In this description, it is assumed by way of example that the input signal is configured in a fixed-length transport packet and an identifier code indicating that data is recorded in the method of FIG. 2, 3, or 4 is added to the data. FIG. 14 shows an identifier code and a sector address, the identifier code denoting that the input signal is in the transport packet configuration. The sector address of FIGS. 5 and 6 including three bytes, i.e., 24 bits is expressed by 23 bits and the upper-most bit is assigned as the identifier code in FIG. 14. For example, the input signal is in the transport packet form when the identifier code is set to, e.g., zero, and the input signal is in other forms when the code is, for example, one. In this connection, the position of the sector address shown in FIGS. 5 and 6 is used as that of the identifier code in the correction block.

In accordance with the 12th embodiment, the data reproduction apparatus can recognize the recording format according to the identifier code and hence appropriately reproduces the data on the disk. Moreover, in this embodiment, although the identifier code indicating whether or not the input signals are in the transport packet configuration is stored in a portion of the sector address area, it is also possible to store the identifier code in a portion of the block address field of FIGS. 5 and 6 in a similar fashion.

According to the present invention, there is attained an advantage that the data can be easily retrieved in the sector unit and the operation to reproduce data in the sector unit can be carried out at a high speed. Since the total of one-sector main data having a capacity expressed by a power of two and a portion of appended data added to the sector is equal to the data capacity of a plurality of transport packets, compressed video signals and user data for data application can be efficiently recorded on the disk while reducing the invalid unused areas in the recording areas of the disk. Furthermore, when the output data is produced only by achieving the C1 correction, the data can be outputted in a sequence equal to the data input sequence, which advantageously facilitates special data reproducing operations.

Incidentally, the media on which data is recorded according to the present invention naturally includes optical, magnetic, opto-magnetic disks and the contour thereof is not limited to that of a disk. Moreover, the data need not be successively recorded thereon.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An information recording medium containing:
   a plurality of synchronizing blocks arranged to form a sector;
   a plurality of said sectors arranged to form an error correction block;
   at least a synchronizing signal contained in each of said synchronizing blocks; and
   a code for identifying said sector, said code being contained in one of said synchronizing blocks;
   wherein the synchronizing signal of the synchronizing block in said sector which contains said code for identifying said sector has a pattern which is different from a pattern of a synchronizing signal of all synchronizing blocks within the sector which do not include said code for identifying said sector, the synchronizing signal of the synchronizing block which contains said code for identifying a sector is the same as a synchronizing signal of a synchronizing block in another sector which includes a code for identifying said other sector and each synchronizing signal in all synchronizing blocks has the same data length as all other synchronizing signals in said synchronizing blocks.

2. An information recording medium containing:
   data sectors, each sector being formed of a plurality of synchronizing blocks;
   respective synchronizing signals added to each of said plurality of synchronizing blocks; and
   a code added within a sector, for identification of the sector, said code comprising a plurality of positions;
   wherein the synchronizing signal for a synchronizing block in said sector which includes a first position of the code for identification of said sector has a pattern which is different from a pattern of a synchronizing signal of all synchronizing blocks within the sector which do not include the first position of said code for identification of said sector, the synchronizing signal of the synchronizing block which includes the first position of said code for identification of a sector is the same as a synchronizing signal of a synchronizing block in another sector which includes a first position of a code for identification of said other sector and each synchronizing signal in all synchronizing blocks has the same data length as all other synchronizing signals in said synchronizing blocks.

3. An information medium having data recorded thereon, wherein:
   data inputted in a time series are equally subdivided into n-byte data, each n-byte data forming one row;
   q n-byte data are arranged in the form of a matrix including q rows and n columns;
   an a-byte second error correction code is added to each of the columns of the q by n matrix;
   a b-byte first error correction code is added to each of the rows of the matrix created by adding the second error correction code to the q by n matrix;
   c rows of the matrix generated by adding the first and second error correction codes to the q by n matrix are arranged to form one sector;
   p sectors are arranged to form one correction block;
   data of each of the sectors include a sector number unique thereto in every s-th row of the sector, at a first row thereof;
   a code enabling identification of the sector number is added over the s rows;
   one of the codes indicating a first position of the cycle of the s rows different from the other codes; and
   a, b, c, n, p, q and s are integers.

4. An information medium according to claim 3, wherein at least data of the c rows are continuously arranged and recorded on the medium.

5. An information medium according to claim 3, wherein data of said c rows are arranged and recorded continuously on the medium from its inner periphery toward its outer periphery.

* * * * *